Sept. 22, 1936.     T. R. PRIDDY     2,055,307
APPARATUS FOR REMOVING TIE ELEMENTS FROM HANDS OF LEAVES
Filed Jan. 27, 1936     3 Sheets-Sheet 2
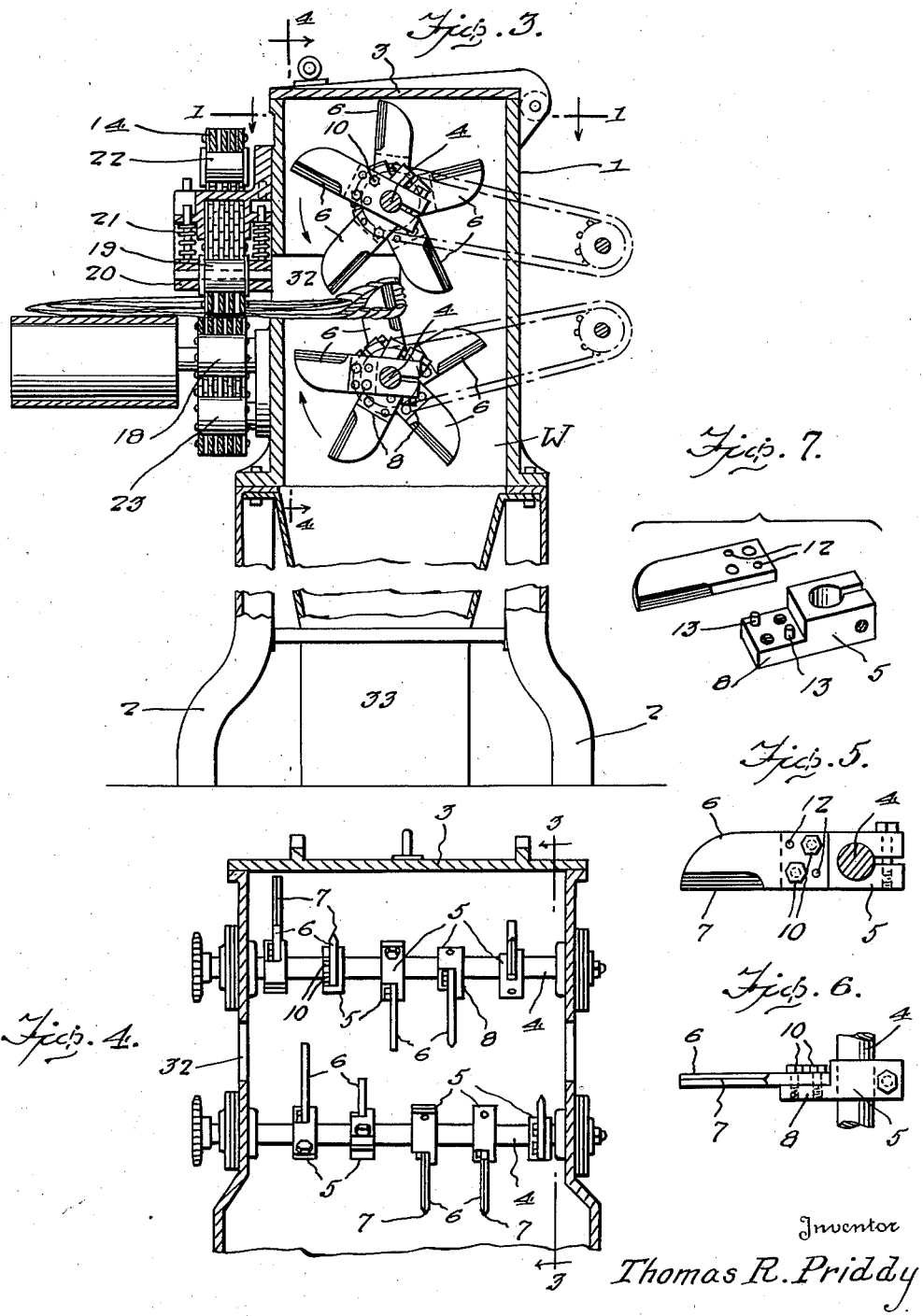
Inventor
Thomas R. Priddy
By
Attorney

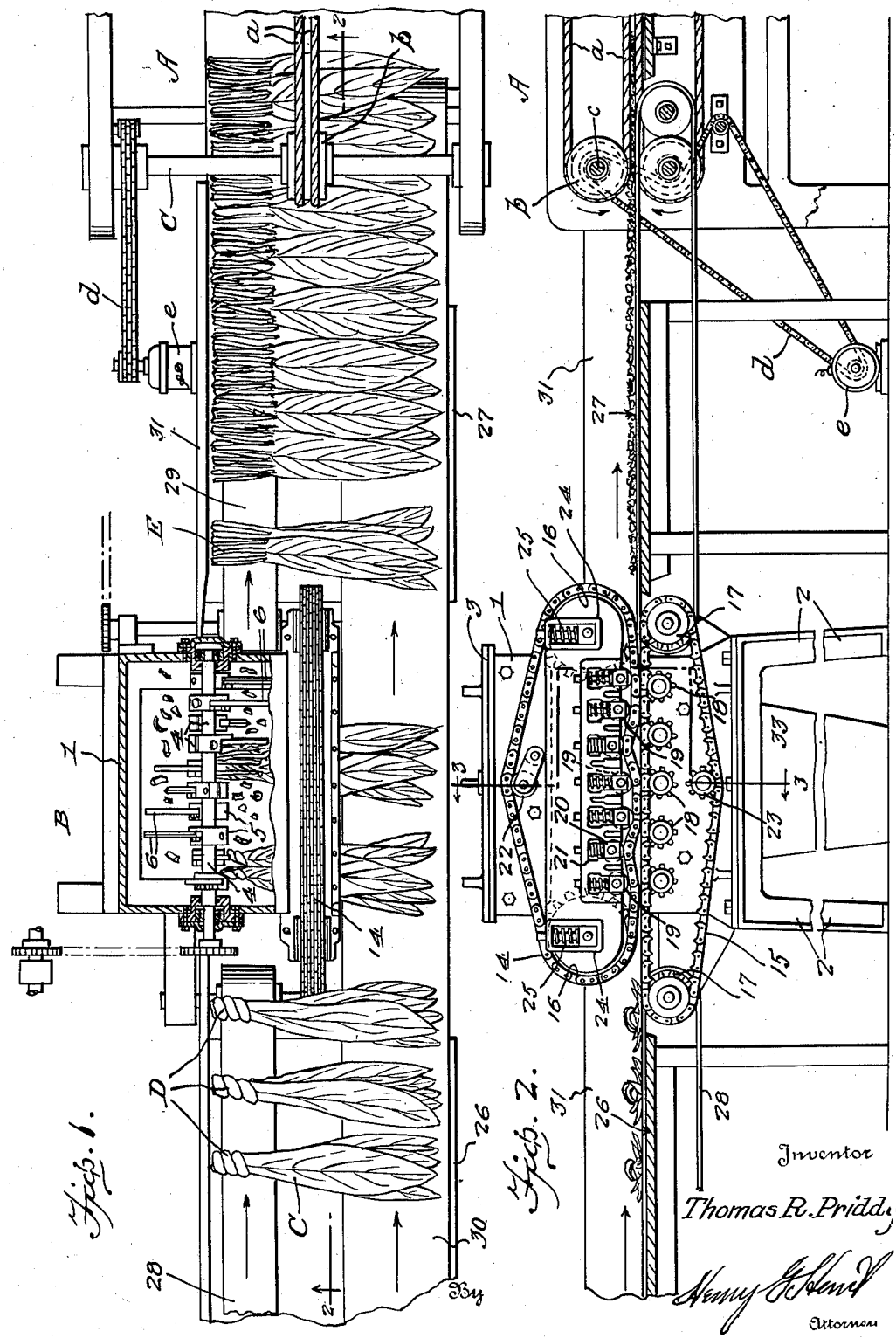

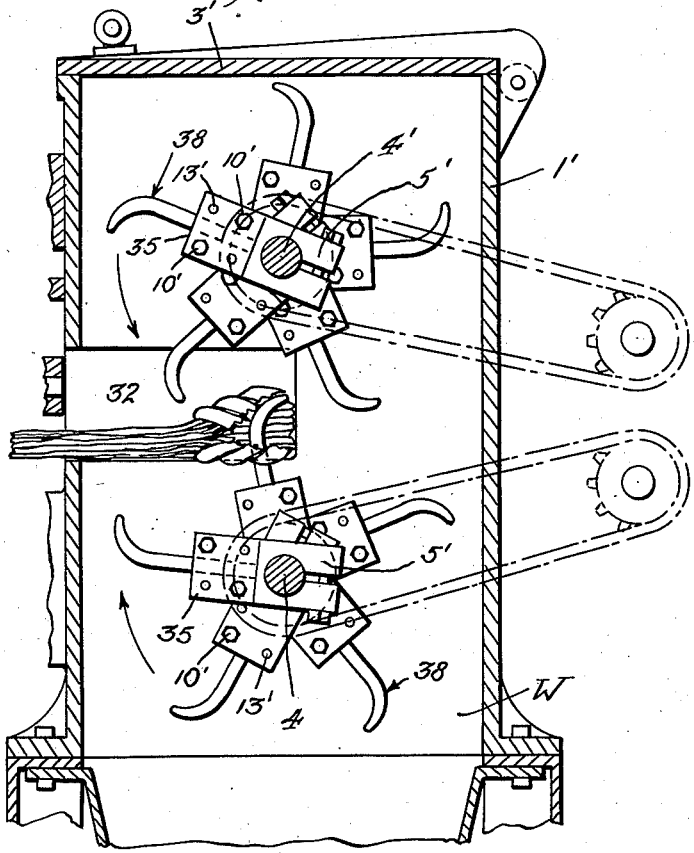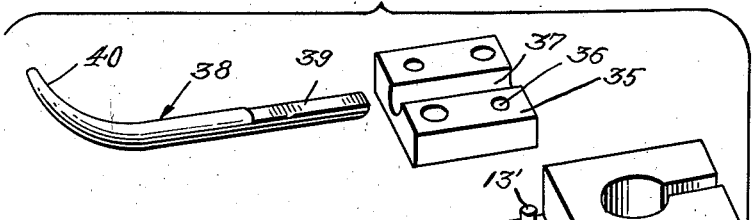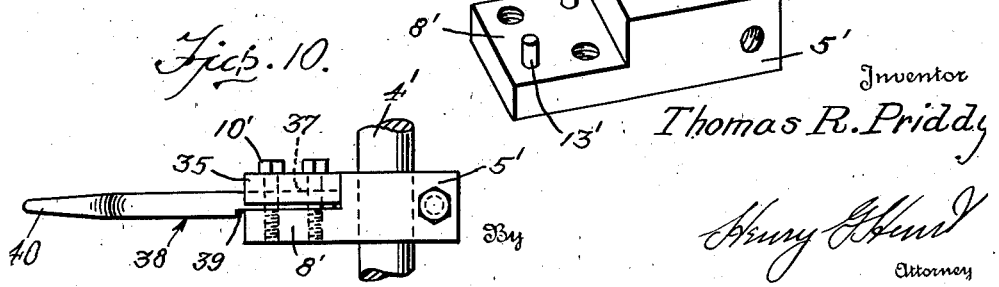

Patented Sept. 22, 1936

2,055,307

UNITED STATES PATENT OFFICE 2,055,307

APPARATUS FOR REMOVING TIE ELEMENTS FROM HANDS OF LEAVES

Thomas R. Priddy, Richmond, Va., assignor to The American Tobacco Company, New York, N. Y., a corporation of New Jersey Application January 27, 1936, Serial No. 61,091

4 Claims. (Cl. 131—57)

My present invention relates generally to tobacco stemming machines and more particularly to mechanism for feeding "hands" or tied bundles of leaves and for removing the tie-leaf from each "hand" or bundle as it is fed to the stemming machine where the membraneous portions of the leaves are stripped from their stems, and this application is a continuation in part of my prior application Ser. No. 9,506, filed March 5, 1935.

As pointed out in my said prior application Ser. No. 9,506, a so-called "hand" of tobacco consists of a number (from 20 to 50) of tobacco leaves tied together at their butt ends with another tobacco leaf which is wound about the butts with the free end of the tie-leaf tucked in between the stems of two adjacent leaves in order to hold the "hand" or bundle intact for future handling, such as curing, ageing and other treatments.

Also as pointed out in my said prior application the general practice up to the time of the invention forming the subject matter of my said application, in removing the "tie" leaves from the "hands" was performed manually and was slow and tedious.

In my said prior application Ser. No. 9,506, I disclose automatic apparatus for effecting the removal of the "tie" leaves during the feeding of the "hands" of leaves to a stemming machine. In said application the implements which directly effect the removal of the "tie" leaves are shown and described as cutting blades, and although these operate with success, I have found that the same result may be obtained in an improved manner by the use of implements other than cutting blades which directly engage and remove the "tie" leaves.

The principal general object of the present invention may, therefore, be said to reside in the provision of hooks or hook-like members in the place of cutting blades to engage and remove the tie leaves from the "hands" of leaves.

The mechanism for feeding the "hands" of leaves to the removing means and stemming machine is shown and described in the present application to be the same as that shown and described in my said prior application.

In order to enable others skilled in the art to understand, construct and use my said invention, I will now proceed to describe the same in detail, reference being made for that purpose to the accompanying drawings, wherein—

Fig. 1, is a top plan view of the machine shown applied to a known type of stemming machine.

Fig. 2, is a vertical section taken along the line 2—2 of Fig. 1.

Fig. 3, is a vertical section taken on the line 3—3 of Fig. 2, showing the "hand" feeding and tie-leaf cutting mechanism.

Fig. 4, is a vertical section on the line 4—4 of Fig. 3.

Figs. 5 and 6 are detail views of one form of tie-leaf cutting blade and its mounting.

Fig. 7, is an exploded view of the cutting blade and its mounting.

Fig. 8, is a view similar to Fig. 3 showing the implements forming the subject matter of the present invention for effecting removal of the "tie" leaves.

Fig. 9, is a view similar to Fig. 7 showing one of the removing hooks and its mounting with the parts in inverted position.

Fig. 10, is a view similar to Fig. 6 showing one of the removing hooks secured to its mounting.

Referring to Figs. 1 and 2 of the drawings, the reference letter A indicates generally the feed end of a tobacco stemming machine, as, for example, the machine of the C. G. Maxwell patent, No. 1,986,781, and the reference letter B indicates generally my improved tie-leaf cutting and feeding mechanism shown in association with such a tobacco stemming machine.

In the stemming machine of the Maxwell patent, the leaves to be stemmed are carried through the machine by means of opposed groups of endless cables $a$, as more clearly described in the said patent, said cables being mounted in part upon pulleys $b$, that are in turn mounted upon a shaft $c$, driven in any suitable manner as by means of a chain $d$, from a motor $e$.

My improved tie-leaf cutting and removing means consists, in the illustrated form of the invention, of a housing 1, mounted upon legs 2, the housing having a hinged cover 3 at its upper end whereby access may be gained to the interior thereof.

Journaled in bearings carried by the end walls W of the housing and extending transversely thereof are two horizontal shafts 4, one of which is located above the other, said shafts being rotated in opposite directions by any suitable means, such as the chain and sprocket arrangement illustrated in Figs. 1 and 3, although it is obvious that any other arrangement of driving means may be employed, the means illustrated being merely by way of illustration.

Upon each of the shafts 4 is mounted a plurality of blade holders 5, each of which carries a removable blade 6, having a cutting edge 7. Each blade-holder 5, as more clearly shown in Figs. 6 and 7, has an offset flange 8 to receive its blade 6, which is removably secured thereto by means of screw bolts 10, the blades being further provided with spaced openings 12 to aline with suitable pins 13 carried by the offset portion 8. Obviously, the removable cutting blades may be otherwise mounted upon the shafts 4 without departing from the spirit of the invention. The blades 6 are made readily removable from their holders in order that they may be quickly detached for sharpening purposes and then quickly replaced.

As will be seen by reference to Fig. 4, I have shown each of the shafts 4 as provided with five spaced-apart cutting blades 6, the blades on each shaft being preferably arranged at different angles so as to present a substantially spiral arrangement, and it will also be seen that the blades of one set are offset laterally with relation to the blades of the other set. It will also be seen by referring to Fig. 3, that the tip ends of the blades of one shaft overlap the tip ends of the blades of the other shaft during the rotation thereof, and that the blades operate alternately and successively upon the tie-leaves of the "hands" of leaves, as will hereinafter more clearly appear. The foregoing is an important feature of the invention covered by my said prior application.

I provide at the front of the housing 1, and in spaced relation to the two sets of rotary cutters, a mechanism for gripping and advancing the "hands" of leaves through the housing and in the range of action of the cutting blades, so that said blades will cut and remove the tie-leaves that are wrapped around the butt ends of the "hands", or bundles of leaves during such advance. In Fig. 1 of the drawings the "hands" of leaves are indicated by the letter C, and the tie-leaves are indicated by the letter D.

This means for gripping and advancing the "hands" of leaves, comprises an upper endless chain of links 14, preferably composed of fiber links, although metal links may be employed if desired, and a lower set of endless links 15. The upper set of endless chain links is mounted upon spaced-apart sprockets or pulleys 16 disposed at opposite ends of the housing 1 and the lower set 15 of endless chain links is mounted upon sprockets 17, as more clearly shown in Fig. 2. The two endless chains of links have opposed parallel runs forming between them a gripping means for gripping and transporting the "hands" of leaves C fed therebetween, and for carrying them within the range of action of the cutting blades 6 so that during the movement of the "hands" through the cutting range of the blades, the tie-leaves D are cut and removed from the "hands", leaving the "hands" or bundles of leaves untied, so they will assume substantially the condition shown at E to the right of Fig. 1.

I prefer to provide a plurality of spaced-apart idler sprockets 18, upon which the upper run of the lower endless chain may be supported, and I further prefer to provide a plurality of yieldably mounted rollers 19 to press or bear upon the lower run of the upper endless chain, so as to yieldingly press the upper run of the chain against the "hands" of leaves as they are fed forward by the chains and so as to prevent the leaves from moving endwise under the pulling strain of the cutting-blades during the tie-leaf cutting operation. The idler rollers 19 are mounted in vertically-movable bearings 20 normally urged downward by means of coiled springs 21, as more clearly shown in Fig. 2, and the upper chain 14 is provided with a tensioning roller 22. The lower chain links are provided with a tensioning sprocket 23. I also prefer to mount the sprockets 16 upon vertically-yielding bearings 24, that are normally urged downward by means of springs 25. Obviously, any other approved "hand" gripping and advancing means may be employed in lieu of the means described.

As will be seen by referring to Figs. 1 and 2, the endless "hand" gripping and transporting means presents parallel runs, which extend across and slightly beyond the entire width of the housing for the cutters so that the "hands" of leaves fed between the parallel runs will be firmly gripped at a point intermediate their ends during the entire time they are transported through the tie-leaf removing mechanism.

A table 26 is provided at the feed end of the "hand" gripping and conveying means and another table 27 is interposed between said means and the feed end of the stemming machine A as more clearly shown in Figs. 1 and 2. An endless feed belt 28 is arranged to travel over the table 26, and operated to feed or advance the "hands" of leaves up to the entrance end of the "hand" gripping and transporting mechanism, and a similar endless feed belt 29 is arranged between the exit end of the tie-leaf removing means and the entrance or feed end of the stemming machine A, said feed belts being mounted upon suitably arranged pulleys that may be driven in any suitable manner. I also provide a feed belt 30, which is arranged to travel over the two tables 26 and 27, and in front of the tie-leaf removing means, and which belt likewise extends into the feed end of the stemming machine. The three belts 28, 29 and 30, together with the endless "hand" gripping and transporting means, convey the "hands" of leaves through the tie-leaf removing means, and from then directly into the stemming machine where the membraneous portions of the leaves are removed.

The tables 26 and 27 are provided at their rear ends with upstanding guide boards 31 against which the butt ends of the "hands" of leaves may be caused to abut in order to properly aline the "hands" and the leaves.

As will be seen by referring to Figs. 3 and 4, the end walls W of the housing 1, are cut away to provide openings 32, which are located in the path of travel of the "hands" of leaves so that the latter may be transported through the housing and in the range of action of the cutting blades.

I prefer to arrange or locate the tie-leaf removing means a slight distance in advance of the feed end of the stemming machine A, as more clearly shown in Figs. 1 and 2, and provide the separate endless feeding means described in order to leave sufficient space at this point to accommodate one or more operators who can spread or separate the leaves of the "hands" by hand after the tie-leaves have been removed therefrom, so that the leaves may be more uniformly separated or spread before being fed into the stemming machine.

It will be understood that the endless means for feeding the "hands" of leaves as shown at the left-hand end of Figs. 1 and 2 and the associated table 26, will be of considerable length in order to accommodate a sufficient number of operators to place the "hands" of leaves upon the endless feed belts. This is desirable, if not necessary, because the capacity of the stemming machine, which is a high capacity machine, depends for its output upon the rapidity with which the leaves are fed thereto, and it is desirable, therefore, to arrange to keep the feed belts 28 and 30 leading up to the tie-leaf and removing means fed to substantial capacity with the "hands" slightly spaced one from the other substantially as shown to the left of Fig. 1.

The housing 1 is provided at its lower open end with a hopper 33 to convey away the fragments of the cut tie-leaves as they are cut and removed from the "hands". The lower end of the hopper may lead to a conveyor or to a lower floor of the building in which the stemming operations are carried on.

In Figs. 8–10 I have shown the improvement constituting the principal subject matter of the present application, and in these figures the primed numerals indicate the same parts as the unprimed numerals of Figs. 1–7.

Referring first to Figs. 9 and 10 it will be noted that the holders or blocks 5', corresponding to the blocks 5 of Figs. 5–7, are adapted to receive, on their offset flanges or extensions 8', the blocks 35. The block 35 in Fig. 9 is shown in inverted position, and the openings 36 receive the pins 13' when the parts are properly related. The block 35 is also provided with a longitudinal arcuate channel 37.

As previously mentioned instead of utilizing cutting blades to effect removal of the tie elements, I have found that relatively blunt fingers or hook-like elements may be used for the same purpose. In Figs. 8–10 these fingers or hooks are designated generally by the numeral 38, and the shank of each of said elements is cut away to provide a relatively flat surface 39 while the remainder of the shank is arcuate to fit the groove 37 in the block 35. The outer ends of the fingers or hooks 38 are preferably curved and reduced as indicated by the numeral 40 to provide a tie element engaging and removing portion.

To assemble the parts of Fig. 9, the shank of the element 38 is inserted in the groove 37 of the block 35, and the parts are then turned and placed over on the flange 8' of the block 5' with the flat surface 39 engaging against the upper face of the flange 8'. The bolts 10', corresponding to bolts 10 of Figs. 5–7 are then threaded through the alined openings in the parts 35 and 8' to hold them together with the flat face 39 bound against the upper face of the flange 8' preventing rotative movement of the element 38 relative to its support. By reference to Fig. 10 it will be noted that the thickness of that portion of the shank which engages between the parts 35 and 8' is slightly greater than the depth of the channels 37. This permits the obtaining of a tight binding action to firmly hold the elements in place during their rotation with the shafts 4' and removal of the tie elements as shown in Fig. 8, it being noted that the fingers or hooks 38 are arranged offset relative to each other on the respective shafts in substantially the same manner as the blades 6 of Figs. 1–4.

The construction and arrangement of the fingers or hooks 38 is such as to prevent the cutting or shredding of the stems which occurs when sharp blades are used, and it is this feature which constitutes the essential matter of the present application as distinguished from my said prior application Ser. No. 9,506.

What I claim is:

1. A mechanism for removing tie-elements from the butt ends of "hands" of leaves, comprising means for gripping and advancing said "hands" of leaves along a common path of travel, rotary fingers mounted upon an axis substantially parallel to said path of travel of the "hands" of leaves, and means to rotate said fingers transversely to said path of travel of the "hands" of leaves whereby said fingers engage and remove said tie-elements from successive "hands" of leaves.

2. A machine for effecting removal of the tie-leaves from "hands" of leaves, comprising a housing having a pair of horizontal shafts arranged one above the other and journaled in bearings in the opposite walls of the housing, a plurality of hooks secured to each shaft, said hooks being offset relative to each other, and endless means for gripping and advancing the tied butts of the "hands" within the range of action of the said hooks.

3. A machine for tearing the tie-leaves from "hands" of leaves, comprising two opposed sets of rotary hooks with the hooks of one set offset relative to those of the other set, means for rotating the hooks in opposite directions, and opposed endless gripping and advancing means having parallel runs located for travel in a horizontal path in front of and in a plane between the said two sets of hooks.

4. A mechanism for removing tie-elements from the butt ends of "hands" of leaves, comprising means for gripping and advancing said "hands" of leaves along a common path of travel, rotary fingers mounted upon an axis substantially parallel to said path of travel of the "hands" of leaves, and means to rotate said fingers transversely to said path of travel of the "hands" of leaves whereby said fingers engage and remove said tie-elements from successive "hands" of leaves, said fingers comprising hooks engageable with the tie-leaves of successive "hands".

THOMAS R. PRIDDY.